(12) United States Patent
Steven et al.

(10) Patent No.: US 7,211,619 B2
(45) Date of Patent: May 1, 2007

(54) STABILIZING HIGH-VINYL POLYBUTADIENE

(75) Inventors: Luo Steven, Akron, OH (US); Koji Masaki, Fairlawn, OH (US); Tatsuro Hamada, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 977 days.

(21) Appl. No.: 09/923,983

(22) Filed: Aug. 7, 2001

(65) Prior Publication Data

US 2003/0040594 A1  Feb. 27, 2003

(51) Int. Cl.
*C08L 9/00* (2006.01)
*C08K 5/13* (2006.01)

(52) U.S. Cl. .................. 524/571; 524/349; 524/248

(58) Field of Classification Search ............... 524/323, 524/571, 572, 349, 248; 526/335
See application file for complete search history.

(56) References Cited

U.S. PATENT DOCUMENTS

| | | | | |
|---|---|---|---|---|
| 3,935,160 | A | * | 1/1976 | Kline .................. 260/45.8 NT |
| 4,501,867 | A | * | 2/1985 | Ueno et al. .................. 526/136 |
| 4,759,862 | A | * | 7/1988 | Meier ........................ 252/47.5 |
| 5,169,547 | A | * | 12/1992 | Farng et al. ................. 252/49.6 |
| 5,298,562 | A | * | 3/1994 | Ceska et al. ................. 525/244 |
| 5,362,783 | A | * | 11/1994 | Eiffler et al. ................. 524/154 |
| 5,919,875 | A | * | 7/1999 | Luo et al. .................... 526/139 |
| 6,117,956 | A | * | 9/2000 | Luo ........................... 526/145 |
| 6,180,734 | B1 | * | 1/2001 | Luo ........................... 526/139 |
| 6,201,080 | B1 | * | 3/2001 | Luo et al. .................... 526/139 |
| 6,211,313 | B1 | * | 4/2001 | Luo ........................... 526/139 |
| 2001/0012878 | A1 | * | 8/2001 | Luo ........................... 526/139 |

FOREIGN PATENT DOCUMENTS

JP    57-55950 A  *  4/1982

* cited by examiner

*Primary Examiner*—David W. Wu
*Assistant Examiner*—Rip A. Lee
(74) *Attorney, Agent, or Firm*—Arthur M. Reginelli; Meredith E. Hooker

(57) ABSTRACT

A stabilized high-vinyl polybutadiene composition comprising a high-vinyl polybutadiene, and an antioxidant defined by the formula

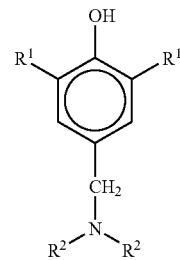

where each $R^1$ and $R^2$, which may be the same or different, are mono-valent organic groups, or where each $R^1$, which may be the same or different, is a mono-valent organic group and the two $R^2$ groups join to form a divalent organic group.

9 Claims, No Drawings

STABILIZING HIGH-VINYL POLYBUTADIENE

FIELD OF THE INVENTION

This invention relates to a method of stabilizing high-vinyl polybutadiene from thermal crosslinking and the resulting stabilized high-vinyl polybutadiene compositions.

BACKGROUND OF THE INVENTION

Two forms of commercially useful high-vinyl polybutadiene include syndiotactic 1,2-polybutadiene and atactic 1,2-polybutadiene. Syndiotactic 1,2-polybutadiene is a high-vinyl polybutadiene that has a stereoregular structure in which the side-chain vinyl groups are located alternately on the opposite sides in relation to the polymeric main chain. Although syndiotactic 1,2-polybutadiene is a crystalline thermoplastic resin, which results from its stereoregular structure, it uniquely exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof. For example, syndiotactic 1,2-polybutadiene can be added to rubber stocks for the manufacture of tires.

Atactic 1,2-polybutadiene is an amorphous, rubbery elastomer that has a stereoirregular structure in which the side-chain vinyl groups are located randomly on the opposite sides in relation to the polymeric main chain. Atactic 1,2-polybutadiene is utilized in a variety of applications. For example, atactic 1,2-polybutadiene is useful in tire tread compositions because it provides a good balance of traction and rolling resistance.

Due to its high-vinyl structure, high-vinyl polybutadiene is prone to thermal crosslinking to form a gel, i.e., an insoluble and non-processable material. Unfortunately, after being synthesized, high-vinyl polybutadiene is often isolated and dried at high temperatures. Or, when used as an additive in the manufacture of tires, it is subjected to compounding temperatures that can reach 165–180° C. During the compounding, it is critical that high-vinyl polybutadiene is not gelled before it is mixed with other ingredients. Otherwise, good dispersion of the polymer in other ingredients cannot be achieved. Also, especially in the case of syndiotactic 1,2-polybutadiene, molding, such as injection or compression molding, typically takes place at temperatures higher than the melting point of the polymer, which can exceed temperatures of 100–200° C. Therefore, the stabilization of high-vinyl polybutadiene is very critical for its utilization.

Many antioxidants have been employed in the art to prevent problems such as thermal crosslinking. The selection of a useful antioxidant, however, is unpredictable, especially when the amount of antioxidant employed is a factor. For example, when high-vinyl polybutadiene is compounded with a rubber for the manufacture of tires, the type and amount of antioxidant employed can deleteriously impact vulcanization of the tire rubber. Further, antioxidants are costly and therefore it can be advantageous to employ a minimal amount of antioxidant.

Therefore, it would be advantageous to find effective stabilizers for preventing the thermal crosslinking of high-vinyl polybutadiene.

SUMMARY OF THE INVENTION

In general the present invention provides a stabilized high-vinyl polybutadiene composition comprising a high-vinyl polybutadiene, and an antioxidant defined by the formula

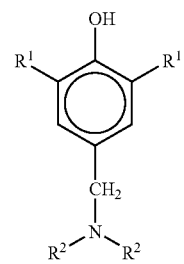

where each $R^1$ and $R^2$, which may be the same or different, are mono-valent organic groups, or where each $R^1$, which may be the same or different, is a mono-valent organic group and the two $R^2$ groups join to form a divalent organic group.

The present invention also includes a method of stabilizing high-vinyl polybutadiene from thermal crosslinking, the method comprising providing a composition of matter comprising high-vinyl polybutadiene, and adding to the composition an antioxidant defined by the formula

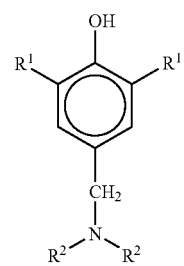

where each $R^1$ and $R^2$, which may be the same or different, are mono-valent organic groups, or where each $R^1$, which may be the same or different, is a mono-valent organic group and the two $R^2$ groups join to form a divalent organic group, thereby forming a mixture of high-vinyl polybutadiene and antioxidant.

The present invention further includes a method of preparing a vulcanizable composition of matter, the method comprising providing a composition of matter comprising high-vinyl polybutadiene, adding to the high-vinyl polybutadiene composition an antioxidant defined by the formula

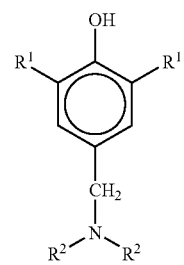

where each $R^1$ and each $R^2$, which may be the same or different, are mono-valent organic groups, or where each $R^1$, which may be the same or different, is a mono-valent organic group and the two $R^2$ groups join to form a divalent organic group, thereby forming a mixture of high-vinyl polybutadiene and antioxidant, providing a rubber, and compounding the rubber with the mixture of the high-vinyl polybutadiene and antioxidant.

The present invention further includes a vulcanizable composition comprising a rubber, from about 0.25 to about 100 parts by weight of high-vinyl polybutadiene per 100 parts by weight of rubber, a curative, and from about 0.1 to about 10 parts by weight of 2,6-dihydrocarbyl-4-(dihydrocarbylaminomethyl)phenol per 100 parts by weight of high-vinyl polybutadiene.

The present invention still further includes a vulcanizate comprising a vulcanized rubber, from about 0.25 to about 100 parts by weight of high-vinyl polybutadiene per 100 parts by weight of rubber, and from about 0.1 to about 10 parts by weight of 2,6-dihydrocarbyl-4-(dihydrocarbylaminomethyl)phenol per 100 parts by weight of high-vinyl polybutadiene.

The unexpected discovery that 2,6-dihydrocarbyl-4-(dihydrocarbylaminomethyl)phenol is a useful antioxidant to prevent the thermal crosslinking of high-vinyl polybutadiene provides many advantages. Indeed, many antioxidants are not capable of stabilizing high-vinyl polybutadiene even though many antioxidants are commonly used to stabilize many other rubbers. And, the amount of 2,6-dihydrocarbyl-4-(dihydrocarbylaminomethyl)phenol required to provide a technologically useful and processable material is substantially low. This is extremely beneficial where the high-vinyl polybutadiene is added to rubber compositions in the manufacture of tire components because the amount of 2,6-dihydrocarbyl-4-(dihydrocarbylaminomethyl)phenol required does not deleteriously impact the rubber vulcanization. Also, since less 2,6-dihydrocarbyl-4-(dihydrocarbylaminomethyl)phenol is employed to effect a stable polymer composition, a significant cost advantage is achieved.

DETAILED DESCRIPTION OF ILLUSTRATIVE EMBODIMENTS

High-vinyl polybutadiene is stabilized from thermal crosslinking by adding 2,6-dihydrocarbyl-4-(dihydrocarbylaminomethyl)phenol to a high-vinyl polybutadiene composition. In one preferred embodiment, an additional antioxidant, such as tris(nonylphenyl) phosphite, is optionally added. The high-vinyl polybutadiene composition that contains 2,6-dihydrocarbyl-4-(dihydrocarbylaminomethyl)phenol may be referred to as a stabilized high-vinyl polybutadiene composition.

The 2,6-dihydrocarbyl-4-(dihydrocarbylaminomethyl) phenol employed as the antioxidant in carrying out this invention may also be referred to as 2,6-dihydrocarbyl-α-dihydrocarbylamino-p-cresol. This antioxidant can be defined according to the formula

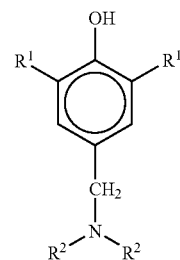

where each $R^1$ and $R^2$, which may be the same or different, are mono-valent organic groups, or the two $R^2$ groups may join to form a divalent organic group. Where the two $R^2$ groups join to form a divalent organic group, a cyclic organoamino group is formed, which may be referred to as a cycloamino group. The antioxidant containing a cycloamino group may be referred to as a 2,6-dihydrocarbyl-4-(cycloaminomethyl)phenol. In this specification, the term 2,6-dihydrocarbyl-4-(dihydrocarbylaminomethyl)phenol has been used to refer to both the dihydrocarbylamino and cycloamino compounds. Preferably, the mono-valent organic groups are hydrocarbyl groups such as, but not limited to, alkyl, cycloalkyl, substituted cycloalkyl, alkenyl, cycloalkenyl, substituted cycloalkenyl, aryl, substituted aryl, aralkyl, arkaryl, allyl, and alkynyl groups, with each group preferably containing from one carbon atom, or the appropriate minimum number of carbon atoms to form the group, up to about 20 carbon atoms. The divalent organic group is preferably a hydrocarbylene group such as, but not limited to, alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbyl and hydrocarbylene groups may contain heteroatoms such as, but not limited to, nitrogen, oxygen, silicon, sulfur, and phosphorous atoms.

Examples of 2,6-dihydrocarbyl-4-(dihydrocarbylaminomethyl)phenol antioxidants include 2,6-di-t-butyl-4-(dimethylaminomethyl)phenol, 2,6-di-t-butyl-4-(diethylaminomethyl)phenol, 2,6-di-t-butyl-4-(dipropylaminomethyl)phenol, 2,6-di-t-butyl-4-(diisopropylaminomethyl)phenol, 2,6-di-t-butyl-4-(dibutylaminomethyl)phenol, 2,6-di-t-butyl-4-(di-t-butylaminomethyl)phenol, 2,6-di-t-butyl-4-(diphenylaminomethyl)phenol, 2,6-di-t-butyl-4-(dineopentylaminomethyl)phenol, 2,6-dimethyl-4-(dimethylaminomethyl)phenol, 2,6-diethyl-4-(dimethylaminomethyl)phenol, 2,6-dipropyl-4-(dimethylaminomethyl)phenol, 2,6-diisopropyl-4-(dimethylaminomethyl)phenol, 2,6-diphenyl-4-(dimethylaminomethyl)phenol, and 2,6-dineopentyl-4-(dimethylaminomethyl)phenol. Examples of 2,6-dihyrocarbyl-4-(cycloaminomethyl)phenols include 2,6-di-t-butyl-4-(pyrrolidinomethyl)phenol, 2,6-di-t-butyl-4-(piperidinomethyl)phenol, 2,6-di-t-butyl-4-(hexamethyleneaminomethyl)phenol, 2,6-diisopropyl-4-(pyrrolidinomethyl)phenol, 2,6-diisopropyl-4-(piperidinomethyl)phenol, 2,6-diisopropyl-4-

(hexamethyleneaminomethyl)phenol, 2,6-diphenyl-4-(pyrrolidinomethyl)phenol, 2,6-diphenyl-4-(piperidinomethyl)phenol, 2,6-diphenyl-4-(hexamethyleneaminomethyl)phenol, 2,6-dineopentyl-4-(pyrrolidinomethyl)phenol, 2,6-dineopentyl-4-(piperidinomethyl)phenol, and 2,6-dineopentyl-4-(hexamethyleneaminomethyl)phenol. Mixtures of any of the foregoing compounds may be employed.

The preferred 2,6-dihydrocarbyl-4-(dihydrocarbylaminomethyl)phenol is 2,6-di-t-butyl-4-(dimethylaminomethyl) phenol, which may also be referred to as 2,6-di-t-butyl-α-dimethylamino-p-cresol. This antioxidant is available under the tradename ETHANOX™ 703 (Albemarle Corporation; Baton Rouge, La.). This preferred antioxidant may be represented by the structure:

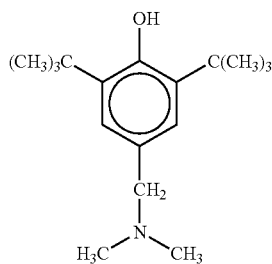

In combination with the 2,6-dihydrocarbyl-4-(dihydrocarbylaminomethyl)phenol, other antioxidants can optionally be employed. In one preferred embodiment, tris(nonylphenyl)phosphite, which is available under the tradename Vanox 13 (R. T. Vanderbilt Co.; Norwalk, Conn.) or Polyguard (Uniroyal Chemical Company; Middlebury, Conn.), is employed in combination with the 2,6-dihydrocarbyl-4-(dihydrocarbylaminomethyl)phenol.

The high-vinyl polybutadiene to which the 2,6-dihydrocarbyl-4-(dihydrocarbylaminomethyl)phenol may be added includes any form of high-vinyl polybutadiene, including syndiotactic 1,2-polybutadiene and atactic 1,2-polybutadiene. High-vinyl polybutadiene is typically characterized by having greater than 50% of its monomeric units in the 1,2-(vinyl) configuration, preferably greater than 60% of its monomeric units in the 1,2-configuration, and even more preferably greater than 70% of its monomeric units in the 1,2-configuration.

In general, syndiotactic 1,2-polybutadiene can have a melting point that ranges from about 70° C. to about 220° C. Typically, syndiotactic 1,2-polybutadiene is characterized by having greater than about 60% of its monomeric units in the 1,2-configuration, and the syndiotacticity of these monomeric units is generally greater than about 60%, where the percentage is determined based on the racemic triad of the vinyl groups, excluding the vinyl groups adjacent to a monomer unit having a 1,4-configuration.

In general, atactic 1,2-polybutadiene is characterized by having a glass transition temperature from about –50° C. to about 0° C. with the absence of a readily detectable melting temperature. These polymers generally have a crystallinity of less than 10%, preferably less than 5%, and even more preferably less than 1%, as measured by differential scanning calorimetry.

High-vinyl polybutadiene is typically synthesized by polymerizing 1,3-butadiene in the presence of a coordination catalyst system or, especially in the case of atactic 1,2-polybutadiene, an anionic catalyst system. These polymerizations can be carried out in solution, i.e., within an organic solvent, within an emulsion, or in bulk, i.e., without solvent. Many polymerization techniques and catalyst systems are known for this polymerization, and the practice of this invention is not limited by the selection of a high-vinyl polybutadiene polymer that has been polymerized by any particular catalyst system or method of polymerization.

Although it is generally known that syndiotactic 1,2-polybutadiene can be prepared by using a variety of coordination catalyst systems such as cobalt-based systems, the preferred catalyst systems are an iron-based catalyst system, a molybdenum-based catalyst system, and a chromium-based catalyst system. These preferred catalyst systems are described in U.S. Pat. Nos. 6,117,956; 5,919,875; 6,201,080; 6,180,734; and 6,211,313, which are incorporated herein by reference, as well as U.S. Ser. Nos. 09/700,017; 09/878,026; 09/788,795; 09/788,802; and 09/826,793, which are incorporated herein by reference. These polymerizations are preferably conducted in solution by using an aromatic, aliphatic, or cycloaliphatic hydrocarbon solvent.

Although several synthetic methods and catalyst systems are known for synthesizing atactic 1,2-polybutadiene, the preferred catalyst systems and synthetic method includes an iron-based or chromium-based catalyst system operating within an organic solvent. These preferred catalyst systems are described U.S. Ser. Nos. 09/475,343 and 09/548,554, which is incorporated herein by reference.

The production of syndiotactic 1,2-polybuatdiene may be accomplished by polymerizing 1,3-butadiene monomer by using a catalytically effective amount of a transition metal catalyst composition. To understand what is meant by a catalytically effective amount, it should be understood that the total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. With respect to the transition metal compound component of the catalyst system (e.g., the iron compound, molybdenum compound, or chromium compound), the amount of transition metal compound used can be varied form about 0.01 to about 2 mmol per 100 g of 1,3-butadiene monomer, more preferably from about 0.02 to about 1.0 mmol per 100 g of 1,3-butadiene monomer, and even more preferably from about 0.05 to about 0.5 mmol per 100 g f 1,3-butadiene monomer.

When high-vinyl polybutadiene is prepared by solution polymerization, the product can be recovered from the polymerization mixture by utilizing conventional procedures of desolventization and drying. For instance, high-vinyl polybutadiene may be isolated from the polymerization mixture by coagulating of the polymerization mixture with an alcohol such as methanol, ethanol, or isopropanol, followed by filtration, or by steam distilling the solvent and the unreacted 1,3-butadiene monomer, followed by filtration. During steam distillation, the polymer could be subjected to temperatures in excess of 100° C. The isolated polymer product is then dried to remove residual amounts of solvent and water. During drying, the polymer could be subjected to temperatures in excess of 100° C. The poymer may also be isolated by directly drum drying the polymer cement, which subjects the polymer to temperatures in excess of 140° C.

In general, from about 0.1 to about 10 parts by weight of 2,6-dihydrocarbyl-4-(dihydrocarbylaminomethyl)phenol per 100 parts by weight of high-vinyl polybutadiene is employed. Preferably from about 0.2 to about 5, and more preferably from about 0.5 to about 3, parts by weight of 2,6-dihydrocarbyl-4-(dihydrocarbylaminomethyl)phenol per 100 parts by weight of high-vinyl polybutadiene is employed.

Where a second, optional, antioxidant is employed, this optional antioxidant can be employed in an amount from about 0.1 to about 10, and preferably from about 0.2 to about 5, parts by weight per 100 parts by weight of high-vinyl polybutadiene.

The 2,6-dihydrocarbyl-4-(dihydrocarbylaminomethyl) phenol antioxidant is preferably added to the high-vinyl polybutadiene after the polymer has been synthesized. In a preferred embodiment, where the high-vinyl polybutadiene is synthesized in solution, the 2,6-dihydrocarbyl-4-(dihydrocarbylaminomethyl)phenol antioxidant is added to the polymer cement prior to isolating and drying the polymer. A polymer cement is a mixture that includes the high-vinyl polybutadiene, residual monomer, and solvent. Typically, especially where an organic solvent is employed, the polymer product and monomer are dissolved within the solvent; although this cement could include suspended or emulsified polymer, which is typically the case where water is the solvent. The cement may likewise include other ingredients such as surfactants and the like.

In another embodiment, pre-synthesized high-vinyl polybutadiene can be obtained and dissolved or suspended in a solvent to form a cement. The antioxidant can then be added to the cement. Useful solvents for making this cement include aliphatic, cycloaliphatic, and aromatic solvents, as well as water, which typically requires the use of a surfactant. Still further, the antioxidant can be blended with the high-vinyl polybutadiene in the solid state, i.e., while the polymer and antioxidant are solids. This solid-state mixing preferably occurs at temperatures below 100° C. In general, this solid-state mixing can take place by using standard mixing techniques within known mixing equipment such as Banbury mixers, Brabender mixers, extruders, kneaders, or mill mixers.

The stabilized high-vinyl polybutadiene of this invention can be employed in a number of uses. For example, the stabilized polymer can be used to make films, fibers, and various molded articles.

In a preferred embodiment, the stabilized high-vinyl polybutadiene is added to rubber compositions that are useful in the manufacture of tires. As is generally known in the art, these rubber compositions or tire formulations include rubber, filler, vulcanizing agent, and sundry additional additives that are common in rubber compounding.

Both synthetic and natural rubber may be employed within the rubber compositions. These rubbers, which may also be referred to as elastomers, include, without limitation, natural rubber, synthetic polyisoprene, poly(styrene-co-butadiene), polybutadiene, poly(styrene-co-butadiene-co-isoprene), poly(styrene-co-isoprene), and mixtures thereof.

The rubber compositions may include fillers such as inorganic and organic fillers. The organic fillers include carbon black. The inorganic fillers may include silica, aluminum hydroxide, magnesium hydroxide, and clays (hydrated aluminum silicates).

A multitude of rubber vulcanizing agents, which are also referred to as curing agents, can be employed within these rubber compositions. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365–468, particularly VULCANIZATION AGENTS AND AUXILIARY MATERIALS pp. 390–402, or *Vulcanization* by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

The rubber compositions may also include other compounding additives such as accelerators, oils, waxes, scorch inhibiting agents, processing aids, antidegradants, zinc oxide, optional tackifying resins, optional reinforcing resins, optional fatty acids, and optional peptizers.

Where the stabilized high-vinyl polybutadiene that is employed within these rubber compositions is syndiotactic 1,2-polybutadiene, the stabilized syndiotactic 1,2-polybutadiene is employed in an amount from about 0.25 to about 25, preferably from about 0.5 to about 15, and more preferably from about 1 to about 10 parts by weight per 100 parts by weight of rubber (per 100 parts by weight of rubber=phr). Where the stabilized high-vinyl polybutadiene is atactic 1,2-polybutadiene, the stabilized atactic 1,2-polybutadiene is employed in an amount from about 1 to about 100, preferably from about 2 to about 75, and more preferably from about 3 to about 50, parts by weight phr.

Fillers are typically employed in an amount from about 1 to about 100 parts by weight phr, and preferably from about 20 to about 90 parts by weight phr, and more preferably from about 40 to about 80 parts by weight phr.

Those skilled in the art will be able to choose a useful amount of the other ingredients that may be employed in these rubber compositions. For example, it is generally known in the art of making tire components that sulfur is typically employed in an amount from about 0.5 to about 10 parts by weight phr, and preferably from about 1 to about 6 parts by weight phr. Oils are typically employed in an amount from about 1 to about 60 parts by weight phr, and preferably in an amount from about 1 to about 50 parts by weight phr. Zinc oxide is typically employed in an amount from about 0.5 to about 8 by weight phr, and preferably from about 1 to about 5 parts by weight phr.

Rubber formulations are compounded by using mixing equipment and procedures conventionally employed in the art. Preferably, an initial masterbatch is prepared that includes the rubber component and the reinforcing fillers, as well as other optional additives such as processing oil and antidegradants. The stabilized high-vinyl polybutadiene is preferably added during preparation of the initial masterbatch. This masterbatch is typically mixed at temperatures in excess of about 100 or 150° C. To prevent premature vulcanization, also known as scorch, the initial masterbatch generally excludes the vulcanizing agent. Once the initial masterbatch is prepared, the vulcanizing agent is blended into the composition at lower temperatures. Rubber compounding techniques and the additives employed therein are generally known as disclosed in *The Compounding and Vulcanization of Rubber*, by Stevens in RUBBER TECHNOLOGY SECOND EDITION (1973 Van Nostrand Reihold Company). The mixing conditions and procedures applicable to silica-filled tire formulations are also well known as described in U.S. Pat. Nos. 5,227,425; 5,719,207; 5,717,022; as well as EP 0890606, all of which are incorporated herein by reference.

The rubber compositions can then be processed into tire components according to ordinary tire manufacturing techniques including standard rubber molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset.

The high-vinyl polybutadiene polymers are typically co-cured with the other rubbers and become part of the network. The other ingredients, such as fillers, oils, and anti-degradants, are generally dispersed throughout the network. The rubber compositions of this invention are preferably used to make tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

An oven-dried 1-liter glass bottle was capped with a self-sealing rubber liner and a perforated metal cap. After the bottle was thoroughly purged with a stream of dry nitrogen gas, the bottle was charged with 105 g of hexanes and 228 g of a 1,3-butadiene/hexanes blend containing 21.9% by weight of 1,3-butadiene. The following catalyst ingredients were then added to the bottle in the following order: (1) 0.050 mmol of iron(III) 2-ethylhexanoate, (2) 0.20 mmol of bis(2-ethylhexyl) hydrogen phosphite, and (3) 0.70 mmol of tri-n-butylaluminum. The bottle was tumbled for 1.5 hr hours in a water bath maintained at 80° C. The polymerization was terminated by adding 1 mL of isopropanol to the polymerization mixture. 1.5 g of 2,6-di-t-butyl-4-(dimethylaminomethyl)phenol (Ethanox 703) in 7 mL of toluene was then added to the polymer cement as the stabilizer. The polymerization mixture was shaken at 80° C. for 10 minutes and cooled to room temperature. The mixture was dried under vacuum at 40° C., giving 50.7 g of syndiotactic 1,2-polybutadiene containing the stabilizer. The yield of the polymer is 49.2 g (98.4%) with the stabilizer excluded. The polymer had a melting temperature of 147° C., a 1,2-linkage content of 89.7%, a syndiotacticity of 81.6%, a number average molecular weight of 161,000, a weight average molecular weight of 340,000, and a polydispersity index of 2.1.

In order to demonstrate the effectiveness of 2,6-di-t-butyl-4-(dimethylaminomethyl)phenol in preventing the thermal crosslinking of syndiotactic 1,2-polybutadiene, about 5 g of the polymer was pressed for 5 minutes at 210° C. to form a film with a thickness of about 0.5 mm. The film was tested for solubility in 1,2-dichlorobenzene. The film was found to be completely soluble in 1,2-dichlorobenzene at 130° C., which indicated that the film contained no gel. Therefore, thermal crosslinking or gelation of syndiotactic 1,2-polybutadiene had been prevented by the presence of 2,6-di-t-butyl-4-(dimethylaminomethyl)phenol as the stabilizer.

Comparative Example 2

The procedure described in Example 1 was repeated except that 2,6-di-t-butyl-4-(dimethylaminomethyl)phenol was replaced by the following commonly used stabilizers: butylated hydroxytoluene, which is also known as 2,6-di-t-butyl-4-methylphenol (BHT; Aldrich Chemical Co.; Milwaukee, Wis.), 4,4'-methylenebis(2,6-di-t-butylphenol) (Ethanox 702; Albemarle Corporation; Baton Rouge, La.), 4-[[4,6-bis(octylthio)-1,3,5-triazin-2-yl]amino]-2,6-di-t-butylphenol (Irganox 565; Ciba-Geigy Corporation; Tarrytown, N.Y.), 2,4-bis[(octylthio)methyl]-o-cresol (Irganox 1520; Ciba-Geigy Corporation), octadecyl 3,5-di-t-butyl-4-hydroxyhydrocinnamate (Irganox 1076; Ciba-Geigy Corporation), 2,2'-ethylidenebis(4,6-di-t-butylphenol) (Vanox 1290; R. T. Vanderbilt Co.; Norwalk, Conn.), bis(3,5-di-t-butyl-4-hydroxybenzyl)sulfide (Sandant 103; Sanshin Chemical Industry Co. Ltd.; Yamaguchi, Japan), 2,5-di-t-amylhydroquinone (Santovar TAHQ; Flexsys; Akron, Ohio), and N,N'-dioctyl-p-phenylenediamine (UOP88; V L; DesPlaines, Ill.). In all of these cases, the syndiotactic 1,2-polybutadiene film formed by pressing for 5 minutes at 210° C. was completely insoluble in 1,2-dichlorobenzene, which indicated that the polymer had been completely gelled. Therefore, these commonly used phenolic-type or phenylenediamine-type stabilizers are ineffective in preventing the thermal crosslinking or gelation of syndiotactic 1,2-polybutadiene.

Various modifications and alterations that do not depart from the scope and spirit of this invention will become apparent to those skilled in the art. This invention is not to be duly limited to the illustrative embodiments set forth herein.

What is claimed is:

1. A stabilized syndiotactic 1,2-polybutadiene composition comprising:
   a syndiotactic 1,2-polybutadiene:
   less than about 1.0 mmol of a transition metal per 100 parts by weight syndiotactic 1,2-polybutadiene; and
   2,6-diethyl-4-(dimethylaminomethyl)phenol, and 2,6-dimethyl-4-(dimethylaminomethyl)phenol.

2. The stabilized syndiotactic 1,2-polybutadiene composition of claim 1, where said syndiotactic 1,2-polybutadiene and said transition metal are derived from polymerizing conjugated diene monomer in the presence of an iron-containing, chromium-containing, or molybdenum-containing catalyst system, where the amount of the iron-containing, chromium-containing, or molybdenum-containing compound employed is from about 0.01 to about 1.0 mmol of iron-containing compound, chromium-containing compound, or molybdenum-containing compound per 100 g of monomer to form syndiotactic 1,2-polybutadiene.

3. The stabilized syndiotactic 1,2-polybutadiene composition of claim 1, where the composition comprises from about 0.01 to about 1.0 mmol of transition metal per 100 parts by weight of said syndiotactic 1,2-polybutadiene.

4. The stabilized syndiotactic 1,2-polybutadiene composition of claim 3, where the composition comprises from about 0.05 to about 0.5 mmol of transition metal per 100 parts by weight of said syndiotactic 1,2-polybutadiene.

5. A stabilized syndiotactic 1,2-polybutadiene composition comprising:
   syndiotactic 1,2-polybutadiene:
   less than about 0.5 mmol of a transition metal per 100 parts by weight syndiotactic 1,2-polybutadiene; and
   2,6-diethyl-4-(dimethylaminomethyl)phenol, and 2,6-dimethyl-4-(dimethylaminomethyl)phenol.

6. The stabilized syndiotactic 1,2-polybutadiene composition of claim 5, where said syndiotactic 1,2-polybutadiene and said transition metal are derived from polymerizing conjugated diene monomer in the presence of an iron-containing, chromium-containing, or molybdenum-containing catalyst system, where the amount of the iron-containing, chromium-containing, or molybdenum-containing compound employed is from about 0.01 to about 0.5 mmol of iron-containing compound, chromium-containing compound, or molybdenum-containing compound per 100 g of monomer to form syndiotactic 1,2-polybutadiene.

7. The stabilized syndiotactic 1,2-polybutadiene composition of claim 5, where the composition comprises from about 0.01 to about 0.5 mmol of transition metal per 100 parts by weight of said syndiotactic 1,2-polybutadiene.

8. The stabilized syndiotactic 1,2-polybutadiene composition of claim 7, where the composition comprises from about 0.05 to about 0.5 mmol of transition metal per 100 parts by weight of said syndiotactic 1,2-polybutadiene.

9. The stabilized syndiotactic 1,2-polybutadiene composition of claim 5, where the composition comprises from about 1 to about 10 parts by weight of said antioxidant per 100 parts by weight of said syndiotactic 1,2-polybutadiene.

* * * * *

UNITED STATES PATENT AND TRADEMARK OFFICE
CERTIFICATE OF CORRECTION

PATENT NO. : 7,211,619 B2
APPLICATION NO. : 09/923983
DATED : May 1, 2007
INVENTOR(S) : Steven et al.

It is certified that error appears in the above-identified patent and that said Letters Patent is hereby corrected as shown below:

Title Page, Item (75) "Inventors:" should read:

Item (75) Inventors: Steven Luo, Akron, Ohio (US);
Koji Masaki, Fairlawn, OH (US);
Tatsuro Hamada, Copley, OH (US)

Signed and Sealed this

Twentieth Day of November, 2007

JON W. DUDAS
*Director of the United States Patent and Trademark Office*